Feb. 20, 1962   E. V. BUNTING ET AL   3,022,092
POWER LIFT HITCH MECHANISM
Filed Jan. 20, 1960   3 Sheets-Sheet 1

INVENTORS.
ERNEST V. BUNTING &
BY HABIBUR RAHMAN

ATTORNEYS.

Feb. 20, 1962   E. V. BUNTING ET AL   3,022,092
POWER LIFT HITCH MECHANISM

Filed Jan. 20, 1960   3 Sheets-Sheet 2

INVENTORS.
ERNEST V. BUNTING &
BY  HABIBUR RAHMAN

Wolfe, Hubbard, Voit & Osann

ATTORNEYS.

INVENTORS.
ERNEST V. BUNTING &
HABIBUR RAHMAN

United States Patent Office  3,022,092
Patented Feb. 20, 1962

3,022,092
POWER LIFT HITCH MECHANISM
Ernest V. Bunting and Habibur Rahman, Detroit, Mich., assignors to Massey-Ferguson Inc., Racine, Wis., a corporation of Maryland
Filed Jan. 20, 1960, Ser. No. 3,558
6 Claims. (Cl. 280—479)

This invention relates to a hitch mechanism for connecting tractors with trailers or trailed implements and it is more particularly concerned with improved hitch mechanisms for use with tractors equipped with power elevatable hitch linkages.

One object of the invention is to provide an improved hitch mechanism of the above general character which affords adequate power for lifting the tongue of a heavy trailed implement from the ground to towing position and for retaining it securely in the raised position.

Another object is to provide hitch mechanism which utilizes the force of the tractor power lift more effectively through the full range of lift.

Still another object is to provide a hitch mechanism of the above general type which affords adequate clearance for the rearwardly projecting tractor power take-off shaft and its housing.

A further object is to provide a trailer hitch mechanism for tractors which is readily replaceable by a conventional drawbar.

It is also an object of the invention to provide a hitch mechanism of simple, sturdy construction adapted to utilize the power lift mechanism of a conventional tractor and capable of being installed without requiring changes in or modifications of the tractor.

Another object of the invention is to provide a hitch mechanism of the above character with a linkage directly connecting the coupling member to the power lift arms of a conventional tractor.

An additional object is to provide a hitch mechanism which may be latched in the raised position to free the tractor hydraulic unit for other uses.

Other objects and advantages will become apparent as the following description proceeds, taken together with the accompanying drawings wherein:

FIGURE 1 is a fragmentary side elevation view of an illustrative trailer hitch embodying the present invention, the hitch being attached to a four-wheeled tractor. Also shown is the tongue of a trailed device such as a trailer. In this view the hitch is shown in its raised, towing position.

Figure 1:
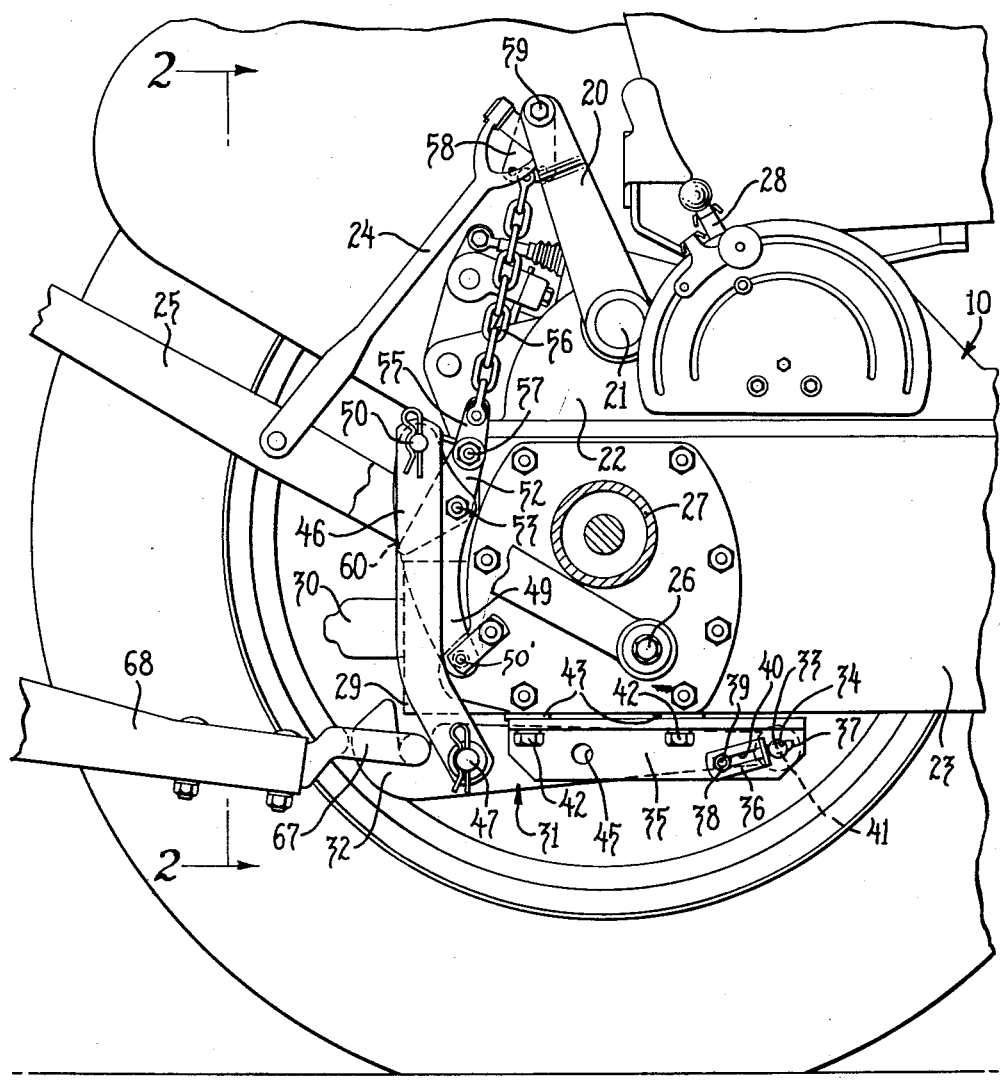

Referring more particularly to the drawings, the invention has been exemplified as embodied in a mechanism designed for attachment to the present commercial form of tractor employing the well-known "Ferguson" draft system. Such mechanism has, accordingly, been illustrated in the drawings as installed on such a tractor indicated in this instance at 10 in FIG. 1. It will be appreciated by those skilled in the art, however, that various substitutions or changes in parts, or alternative or modified arrangements may be used, particularly in accommodating the mechanism to other specific forms of tractors. There is, therefore, no intention to limit the invention to the precise mechanism illustrated. On the other hand, the invention is to cover all alternative or equivalent construction falling within the spirit and scope of the invention as expressed in the specification and the appended claims.

The general construction of the illustrated tractor, including its power lift unit, will be familiar to those skilled in the art. Moreover, the operating of the tractor and its power lift unit is generally similar to that of the tractor shown in the Ferguson Patent No. 2,118,180. For present purposes it will suffice simply to identify those tractor parts with which the mechanism of the present invention is directly associated.

Extending from the rear end of the tractor 10 (FIGS. 1, 2, and 4) are a pair of power lift arms 20 rigidly fixed to opposite ends of a transverse rock shaft 21 journaled in the upper cover plate 22 of the center housing 23. Drop links 24 suspend the draft links 25 from the lift arms 20. The draft links 25 are disposed in forwardly converging, side by side relation and universally pivoted at 26 on the tractor's center housing 23 to swing vertically in unison as well as sway laterally. Check chains of the conventional type may be utilized to prevent excessive swaying. The pivots 26 are located below and slightly forward of the center of the tractor's rear axle 27. A hydraulic power mechanism (not shown) is contained within the tractor body 10 and transmits rotary motion to the shaft 21 causing the lift arms 20 to be raised or lowered in response to the movement of the conveniently located manual control 28 of the hydraulic power mechanism. Also extending from the rear of the tractor center housing 23 is a power take-off housing 29 from which projects a power take-off shaft (not shown), being enclosed in this instance by the protective cap 30.

As so far described, the installation is simply the familiar one in the current form of a tractor utilizing the "Ferguson" draft system. Pursuant to the aims of the present invention, equipment embodying the invention is installed on such an exemplary tractor to utilize the raising and lowering of the power operated lift arms 20 for coupling and uncoupling any desired trailed device, such as a two-wheeled trailer.

Figure 4:
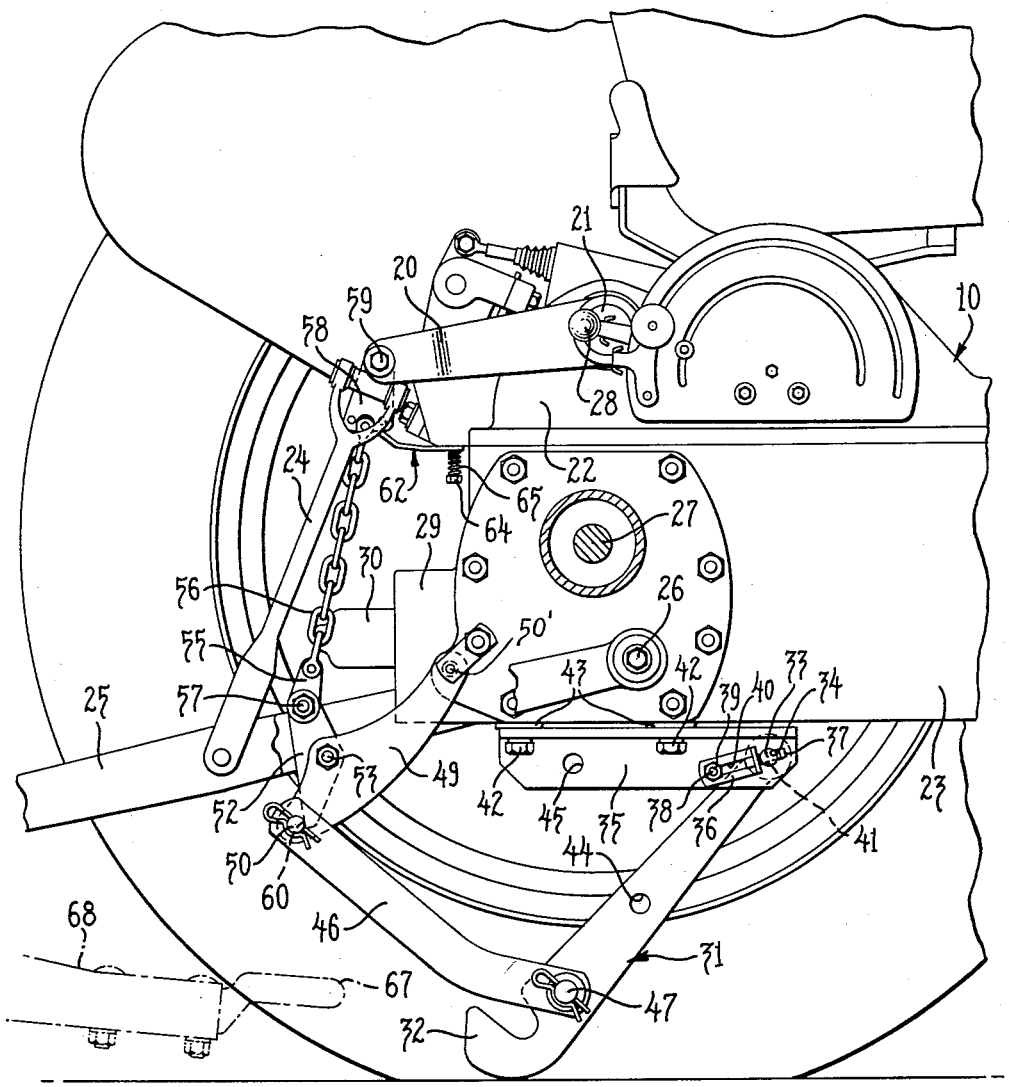
FIG. 4 is a fragmentary side elevation view similar to FIG. 1 but showing the hitching mechanism uncoupled and in a lowered, hitching position.

In the illustrative embodiment, the coupling attachment or mechanisms installed on the tractor (see FIGS. 1, 2, and 4) includes an elongated coupling member 31 carrying at one end some form of a coupling element, here shown as an integral hook 32. To provide for swinging the coupling member 31 between a lowered hitching position (FIG. 4) and a raised towing position (FIG. 1), the coupling member 31 is pivoted at its forward end, in this instance, on a horizontal pin 33, received in apertures 34, of a pair of supporting anchorage fittings or angle irons 35 lying along opposite sides of the member 31. A bracket 36, having a tip portion 37, is slidably mounted on the outer face of each angle iron 35 by a stud 38 fixed to the respective angle irons and adapted to engage in a slot 40 in the associated bracket 36. The studs are threaded for the accommodation of nuts 39 which preferably have conical heads engaging the slots to lock the brackets in place. As shown in FIGS. 1 and 4, the tip 37 engages the cross hole 41 of the pin 33 to secure the pin to the angle bracket. To remove the pivot pin 33, the bracket 36 is slid rearward to disengage the tip 37 from opening 41. Cap screws 42 secure the angle irons 35 to mounting pads or bosses 43 normally provided on the underside of the housing on the "Ferguson type" tractor so that the angle irons rest against the underside of such housing.

The anchorage fittings 35 locate the coupling member 31 in a position such that the latter's pivot 33 is displaced below and somewhat forward of the tractor axle 27. Reinforcement of the coupling member 31 against lateral bending incident to turning of the tractor when a trailer is being towed from the hook 32, is afforded by the angle irons 35. The coupling member 31 is provided with an aperture 44 at a point intermediate its ends and located to register with similar apertures 45 in the angle irons 35 for the insertion of a retaining pin (not shown) to secure the coupling member in a raised towing position, if desired.

In carrying out the invention, a novel toggle-like linkage is provided to raise and lower the coupling member 31 between the lowered hitching position shown in FIG. 4 and the raised towing position shown in FIG. 1, so constructed and arranged that maximum torque is available for lifting the load while achieving a near dead center condition at the top of the stroke for supporting the load during transport. This toggle-like linkage connects the coupling member 31 directly to the tractor lift arms 20, insuring efficient lifting action while providing adequate clearance of the linkage around the protruding power take-off during the entire lifting movement. Accordingly, in the preferred form of the linkage disclosed in the accompanying drawings, a pair of laterally spaced links or side bars 46 are pivotally connected at their lower ends to the coupling member 31. This connection is effected by means of a cross pin 48 welded or otherwise rigidly secured to the coupling member. The projecting ends of the pin are reduced in diameter as at 47 to engage in holes in the links. The shoulders thus formed on the pin cooperate with wire pins or cotters to retain the parts in assembled relation.

A pair of lifting levers 49 secured together in parallel spaced relation by a spacer 51 welded thereto are pivotally connected to the upper end of the side bars by a pin 50 extending through the spacer and projecting at opposite sides of the levers. The inner ends of the lifting levers are pivotally mounted on the tractor center housing 23 as by pins 50' and 51' (FIG. 2).

A lifting member 52 is provided to raise and lower the swinging ends of the lifting levers 49 causing the side bars 46 and the hook 32 to move between the lowered hitching position and the raised towing position. The lifting member 52 is herein shown as a rigid element, preferably formed by casting, of substantially square outline (FIG. 2). This member is pivoted at its center between the lifting levers 49, intermediate the ends thereof, by means of bolts 53 passing through openings in the lifting levers. The upper end of the lifting member 52 is connected to the lift arms 20 by means of tension elements such as chains 56 secured by bolts 57. To facilitate coupling to the chains, ears 55 are secured to the member 52. At the upper ends of the chains, fastening to the arms is achieved by lugs 58 secured to the lift arms by bolts 59.

Figure 2:
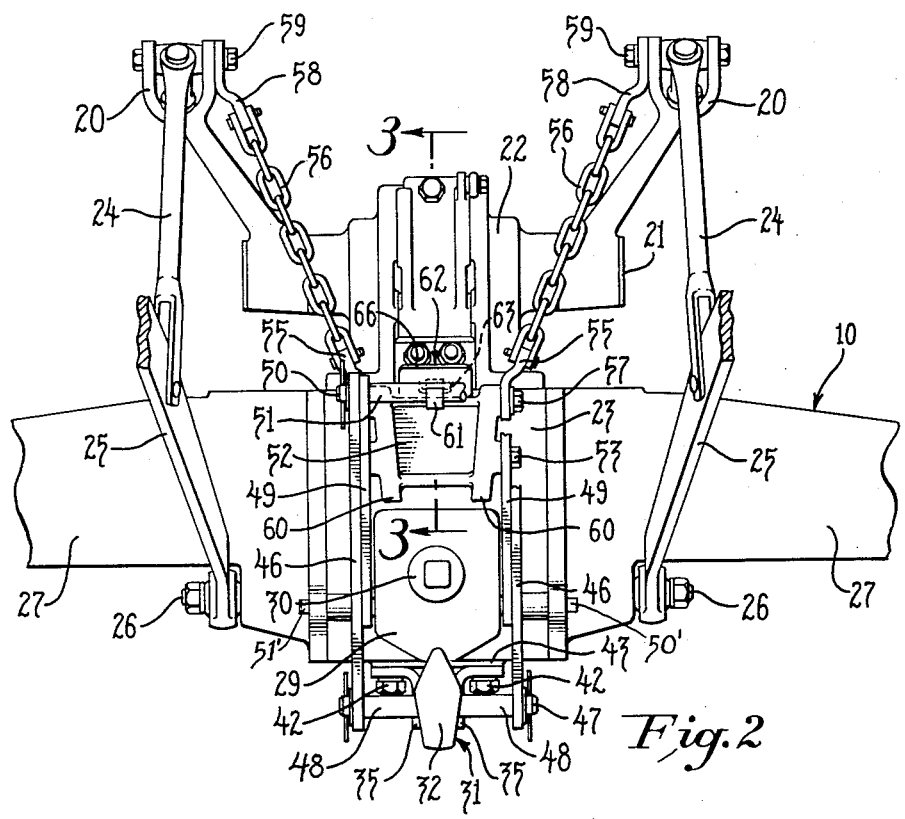
FIG. 2 is a fragmentary sectional view taken generally along the line 2—2 in FIG. 1, the vehicle tongue being omitted.

It is a further feature of the invention that the lifting member 52 is provided at opposite sides with rigid lower extensions 60 as shown in FIGS. 1 and 2. During the initial portion of the lifting movement, the extensions 60 abut against the spacer member 51 as shown in FIG. 4 to swing the lifting member anticlockwise to clear the power take-off housing 29 as the levers 49 swing upward. It will be seen that this arrangement affords a maximum moment arm to the lifting levers 49 during the beginning of the lift.

Figure 3:
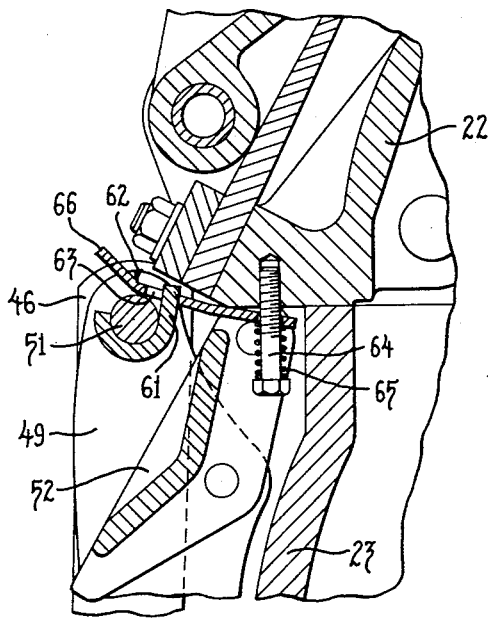
FIG. 3 is an enlarged fragmentary sectional view taken generally along the line 3—3 in FIG. 2.

Provision has been made for latching the coupling unit in its towing position so that the hydraulic unit and the draft links may be freed for other uses. The latching mechanism, as shown in FIG. 3, includes a latching ear 61 rigidly mounted on the pivot member 51 intermediate the ends thereof and arranged so that the catch portion of the ear 61 is disposed generally upward when the lifting levers 49 are in a raised position. To latch the lift levers 49 and the coupling member in the raised position and hold them there, the manually releasable latch member 62 engages the latch ear 61 in an opening 63 formed therein. The latch member is shown with its forward end mounted on the tractor center housing 23 by means of two elongated screws 64 and is biased in latching engagement with the latch ear 61 by compression springs 65 which surround the screws. The trailing end 66 of the latch member 62 is curved upward providing a sliding surface for the latch ear 61 to raise the catch member 62 slightly and allowing the catch member to drop firmly into latching engagement when the ear 61 enters the latch opening 63. It also provides a convenient grip by which the catch 62 can be released manually.

In operation, after the catch is manually released, the hydraulic control lever 28 is moved to the lowering position allowing the lift arms 20 to rotate downward and causing the coupling linkage to lower the hook 32 to the hooking position shown in FIG. 4. The tractor is then backed up until the hook 32 is below and alined with a matching hitching component or eye 67 located on the tongue 68 of a trailed device. With the components thus located in hitching relationship, the hydraulic control lever 28 is moved to the raising position causing the shaft 21 to rotate, swinging the lift arms 20 upward, raising the lift levers 49, the side bars 46 and pulling the coupling member 31 into the raised towing position of FIG. 1. Because of the radius of the lift levers 49, the power take-off is cleared by an adequate margin. As the lifting levers 49 complete their swing upward into the towing position, the catch member 62 raises slightly as the latch ear 61 slides under the extension 66 until the ear enters the latching slot 63 and the member 62 drops into firm latching engagement. With the hitching mechanism thus latched in the towing position, the edge of the hook is closed by reason of its proximity to the lower rear corner of the tractor housing 23 (see FIG. 1) so that the trailed device may be pulled forward, turned or backed up without fear of the trailing device being uncoupled.

Since the members 46, 49 during transport are folded with scissor-like action to near on-center or "dead-center" relation, the downward force of the load is sustained by the heavy pivot pins and only light forces are applied to the latch.

It is a feature of the present invention that the latching of the mechanism in the towing position also frees the hydraulic unit and draft links for other uses. Thus, since the hitch mechanism is connected directly to the tractor lift arms 20 by flexible chains, the lift arms may be thereafter moved up and down to accomplish raising and lowering of the draft links 25 while keeping the hook member 32 locked in its upraised position. Also it will be appreciated by one skilled in the art that auxiliary hydraulic cylinders such as used in front end loaders or other implements such as plows and cultivators may be operated by the lift arms without interfering with the coupling attachment.

To lower the hitching mechanism and uncouple from the trailed device, the operator first moves the hydraulic control lever 28, into the raising position to transfer the weight of the trailed device from the catch member 62 to the lift arms 20. Then the operator releases the catch member 62 by pulling upward on the extension 66 and at the same time moves the hydraulic control lever to the lowering position. This arrangement provides an obvious safety feature in that it prevents unlatching the hitching mechanism until the load is carried by the hydraulic unit. Therefore, the tongue 68 of a trailed device will not be "dropped" freely to the ground damaging it or the contents in the trailed device. Rather, the hydraulic unit provides a dampening effect to the descent and allows the operator to determine the rate of lowering merely by positioning the hydraulic control lever 28. When the coupling hook 32 has been fully lowered and is uncoupled from engagement with the eye 67, the tractor is driven forward slightly to clear the mechanism for raising to the transport position or for detachment from the tractor.

The angle bars 35 may also be used for attachment of a draw bar to the tractor. For that purpose, the coupling unit 31 is detached from the bars and from the associated lift mechanism. The mechanism may also be detached, if desired.

We claim as our invention:

1. A hitch mechanism for use with a tractor having power operated lift arms located adjacent the upper rear portion of the tractor body, said mechanism comprising in combination, an elongated coupling member pivotally mounted at its forward end on the underside of the tractor body and having a coupling element at its trailing end, a toggle-like linkage for swinging said coupling member including a first link pivoted to the tractor body rearwardly of the tractor's rear axle for vertical swinging movement, a second link pivotally connected to the outer end of the first link and to the outer end of the coupling member, and means including a flexible tension element operatively connecting the tractor lift arms to said links adjacent the point of interconnection thereof, said links being dimensioned and their pivots related so that when the lift arms are raised the links scissor together until they are substantially parallel and vertically disposed as the coupling member is raised to transport position.

2. A hitch mechanism for use with a tractor having power operated lift arms located adjacent the upper rear portion of the tractor body, said mechanism comprising in combination, an elongated coupling member pivotally mounted at its forward end on the underside of the tractor body and having a coupling element at its trailing end, a toggle-like linkage for swinging said coupling member including a first link pivoted to the tractor body rearwardly of the tractor's rear axle for vertical swinging movement, a second link pivotally connected to the outer end of the first link and to the outer end of the coupling member, means including a flexible tension element operatively connecting the tractor lift arms to said links adjacent the point of interconnection thereof, said links being dimensioned and their pivots related so that when the lift arms are raised the links scissor together into substantially parallel relation with the point of connection to said tension element directly above the point of connection of the second link to the coupling member as the coupling member is raised to transport position, and a latch cooperating with said linkage for maintaining the links in said substantially parallel relationship while the mechanism is in its upraised position.

3. A hitch mechanism for use with a tractor having power operated lift arms located adjacent the upper rear portion of the tractor body, said mechanism comprising in combination, an elongated coupling member pivotally mounted at its forward end on the underside of the tractor body and having a coupling element at its trailing end, a toggle-like linkage for swinging said coupling member including a first link pivotally connected to the tractor body above the coupling member rearwardly of the tractor's rear axle, a second link pivotally interconnecting the end of the first link with the rear end of the coupling member, means for connecting the lift arms to said links at a point adjacent the point of interconnection thereof, said first link being shorter than said second link so that when upward force is applied by said lift arms, the links scissor together into vertical substantially on-center relation for supporting the load on said coupling member, and means for maintaining the links in said vertical position during transport.

4. A coupling attachment for a tractor having power operated lift arms located adjacent the upper rear portion of the tractor body and a power take-off housing located at the rear portion of the tractor body, said coupling attachment comprising in combination, an elongated coupling member having a coupling element at its trailing end and pivotally mounted at its forward end on the underside of the tractor body, a first pair of links each pivotally connected at one end to said coupling member adjacent its trailing end, a second pair of links respectively pivotally connected at one end to the other ends of said first pair of links and having their opposite ends pivotally mounted on the tractor body at opposite sides of the power take-off housing, a lifting member pivotally connected between said second pair of links at a point intermediate the ends thereof, a tension member connecting said lifting member to the tractor lift arm, and said lifting member having a lower extension which abuts against the pivotal connection of said first and second pairs of links to swing it outwardly to clear the power take-off housing during the initial lifting movement.

5. A hitch attachment for use with a tractor having power operated lift arms located adjacent the upper rear portion of the tractor body, said hitch attachment comprising in combination an elongated coupling member pivotally mounted at its forward end on the underside of the tractor body and having a coupling element at its trailing end, a toggle-like linkage for swinging said coupling member including a first link pivotally connected at one end to said coupling member adjacent the rear end of the latter, a second link pivotally connected at one end to said first link and pivotally mounted at the other end on the tractor body rearwardly of the tractor's rear axle, means including a flexible tension member connecting said second link to the tractor lift arm, said links being dimensioned and their pivots related so that they move into a vertical position and almost to a dead center position when the coupling element is raised to transport position, said second link having a protruding latch ear at the pivoted connection with said first link, and a manually releasable latch for engaging said latching ear to maintain the links near the dead center position when said coupling member is in raised transport position.

6. In an attachment for use on a tractor adapted to tow a trailed device and having power operated lift arms located adjacent the upper rear portion of the tractor body, the combination of a coupling member pivotally mounted at its forward end on the underside of the tractor body and movable between a lowered hitching position and an upraised towing position, said coupling member having a coupling element at its trailing end adapted to be hitched to a trailed device, a transverse pin extending laterally through said coupling member adjacent the trailing end, a pair of elongated side straps in laterally spaced generally parallel relation to each other pivotally connected at one end to said transverse pin, a pair of toggle links in laterally spaced generally parallel relation to each other pivotally connected at one end to the said side straps at the end remote from said transverse pin, the other ends of said toggle links being pivotally connected to the tractor housing, a lifting member pivotally connected between said toggle links at a point intermediate the ends thereof, said lifting member having a pair of lower extensions which abut against the pivotal connection of said side straps and toggle links to swing the lifting member rearwardly and provide a maximum moment arm to said links during the initial upward movement thereof, and a pair of tension links connecting said lifting member to the tractor lift arms.

References Cited in the file of this patent
UNITED STATES PATENTS

| 2,786,695 | Wilson | Mar. 26, 1957 |
| 2,791,444 | McNeice | May 7, 1957 |
| 2,826,433 | Poole | Mar. 11, 1958 |
| 2,904,349 | Frieberg | Sept. 15, 1959 |
| 2,926,931 | Crampton et al. | Mar. 1, 1960 |